United States Patent
Schwartz et al.

(10) Patent No.: US 10,593,444 B2
(45) Date of Patent: Mar. 17, 2020

(54) SELF-MONITORING SUPERCONDUCTING CABLES HAVING INTEGRATED OPTICAL FIBERS

(71) Applicant: North Carolina State University, Raleigh, NC (US)

(72) Inventors: Justin Schwartz, Raleigh, NC (US); Federico Scurti, Raleigh, NC (US)

(73) Assignee: NORTH CAROLINA STATE UNIVERSITY OFFICE OF TECHNOLOGY COMMERCIALIZATION AND NEW VENTURES, Raleigh, NC (US)

(*) Notice: Subject to any disclaimer, the term of this patent is extended or adjusted under 35 U.S.C. 154(b) by 0 days.

(21) Appl. No.: 16/420,730

(22) Filed: May 23, 2019

(65) Prior Publication Data

US 2019/0287699 A1    Sep. 19, 2019

Related U.S. Application Data

(63) Continuation of application No. PCT/US2018/044515, filed on Jul. 31, 2018.
(Continued)

(51) Int. Cl.
| | |
|---|---|
| *H01B 12/02* | (2006.01) |
| *G01K 11/32* | (2006.01) |
| *G01L 1/24* | (2006.01) |
| *H01B 12/00* | (2006.01) |
| *G01D 5/353* | (2006.01) |
| *H01B 7/32* | (2006.01) |

(52) U.S. Cl.
CPC ............. *H01B 12/02* (2013.01); *G01D 5/353* (2013.01); *G01K 11/32* (2013.01); *G01L 1/242* (2013.01); *H01B 7/32* (2013.01); *H01B 12/00* (2013.01)

(58) Field of Classification Search
CPC .......... H01B 12/02; H01B 7/32; H01B 12/00; G01D 5/353; G01K 11/32; G01L 1/242
See application file for complete search history.

(56) References Cited

U.S. PATENT DOCUMENTS

| | | |
|---|---|---|
| 5,426,716 A | 6/1995 | Arroyo et al. |
| 6,112,531 A | 9/2000 | Yamaguchi |

(Continued)

OTHER PUBLICATIONS

Scurti et al. "Quench detection for high temperature superconductor magnets: a novel techniquebased on Rayleigh-backscattering interrogated optical fibers" Superconductor Scietnce Technology 29 (Year: 2016).*

(Continued)

*Primary Examiner* — Paul A Wartalowicz
(74) *Attorney, Agent, or Firm* — Thomas | Horstemeyer, LLP (57) ABSTRACT

Disclosed are various embodiments for a self-monitoring conducting device that responds to strain and temperature changes. In one example, a self-monitoring conducting device comprises a superconducting cable having a core and one or more layers of high-temperature superconductor (HTS) tape architecture surrounding the core. The self-monitoring conducting device further includes optical fibers integrated within the superconducting cable. The optical fibers can monitor a state of the superconducting cable along a length of the superconducting cable.

20 Claims, 10 Drawing Sheets

Related U.S. Application Data

(60) Provisional application No. 62/538,997, filed on Jul. 31, 2017.

(56) References Cited

U.S. PATENT DOCUMENTS

| | | |
|---|---|---|
| 8,111,125 B2 | 2/2012 | Antaya et al. |
| 2004/0138066 A1* | 7/2004 | Sinha ................ H01B 9/04 505/231 |
| 2009/0118126 A1* | 5/2009 | Burke ............... H01L 39/2461 505/211 |
| 2015/0018221 A1* | 1/2015 | van der Laan ........ H01B 12/02 505/230 |
| 2016/0047763 A1* | 2/2016 | Omichi ................ G01K 1/14 374/161 |
| 2017/0179364 A1 | 6/2017 | Schwartz et al. |

OTHER PUBLICATIONS

International Search Report in co-pending, related PCT Application No. PCT/US2018/044515 dated Nov. 1, 2018.

* cited by examiner

SELF-MONITORING SUPERCONDUCTING CABLES HAVING INTEGRATED OPTICAL FIBERS

CROSS-REFERENCE TO RELATED APPLICATIONS

This application is a continuation application of PCT Application No. PCT/US2018/044515, filed Jul. 31, 2018, entitled "SELF-MONITORING SUPERCONDUCTING CABLES HAVING INTEGRATED OPTICAL FIBERS, which application claims priority to, and the benefit of, U.S. provisional application entitled "SELF-MONITORING SUPERCONDUCTING CABLES HAVING INTEGRATED OPTICAL FIBERS" having Ser. No. 62/538,997, filed on Jul. 31, 2017, all of which are hereby incorporated by reference in their entireties.

BACKGROUND

Advanced magnet systems being designed for nuclear fusion devices, particle accelerators, magnetic resonance imaging (MRI), energy storage, motors, power generators, and other applications can greatly benefit from the use of high-temperature superconductors (HTS) as they allow magnets to operate at higher magnetic fields. This allows for more compact reactors and elevated operating temperatures, thereby reducing operating costs and improving likely reliability. However, the current HTS magnet designs suffer from the inability to rapidly detect and locate normal zones, raising the possibility that the magnet and associated systems can be damaged if preventative action is not taken fast enough.

SUMMARY

Aspects of the present disclosure are related to a self-monitoring conducting device that responds to strain and temperature changes occurring at the beginning of a normal zone which may or may not be a precursor to a quench condition.

In one aspect, among others, a self-monitoring conducting device, comprises a superconducting cable having a core and one or more layers of high-temperature superconductor (HTS) tape architecture surrounding the core. One or more optical fibers are integrated within the superconducting cable. The one or more optical fibers are configured to monitor a state of the superconducting cable along a length of the superconducting cable.

In various aspects, the core of the self-monitoring conducting device can comprise a hole and a particular optical fiber of the one or more optical fibers is embedded within the hole. In various aspects, the hole is sized such that the particular optical fiber is in contact with the core. In various aspects, the hole is sized such that there is a gap between the core and the particular optical fiber. In various aspects, the gap between the particular optical fiber and the core comprises a thermally conductive material. In various aspects, the hole is positioned within the core or along an outer surface of the core. In various aspects, the superconducting cable comprises a Roebel-type cable. In various aspects, the superconducting cable is configured to operate with magnetic fields above about twenty (20) Tesla. In various aspects, the one or more optical fibers are embedded within the one or more layers of high-temperature superconductor (HTS) tape architecture. In various aspects, the core comprises a plurality of smaller cores. In various aspects, the one or more optical fibers are embedded between the core and one or more layers of HTS tape architecture. In various aspects, the superconducting cable further comprises an insulating material surrounding the HTS tape architecture. In various aspects, the one or more optical fibers are integrated within the insulating material surrounding the HTS tape architecture.

In another aspect, a self-monitoring conducting device, comprises a superconducting cable configured to be operable at about twenty (20) Tesla and above and one or more optical fibers integrated within the superconducting cable. The one or more optical fibers are configured to monitor a state of the superconducting cable along a length of the superconducting cable.

In various aspects, the superconducting cable comprises a Roebel-type cable or a CORC-type cable. In various aspects, the superconducting cable comprises a stack of tape architectures extending a length of the superconducting cable and the stack of tape architectures includes at least one or more HTS tape architectures. In various aspects, the stack of tape architectures further comprise one or more normal conducting tapes. In various aspects, the one or more optical fibers are positioned along at least one side of the stack. In various aspects, the one or more optical fibers are positioned within the stack of the tape architectures. In various aspects, the self-monitoring conducting device comprises an external structure surrounding the stack of the tape architectures. The external structure comprises at least one of aluminum, stainless steel, or copper. In various aspects, the external structure is circular or four-sided. In various aspects, the self-monitoring conducting device comprises an electrically insulating material surrounding the stack of tape architectures. In various aspects, the one or more optical fibers comprises a coating.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1B differs from FIG. 1A in that HTS tape architecture surrounding the core of the superconducting cable is not shown in FIG. 1B.

DETAILED DESCRIPTION

The present disclosure relates to methods and systems for a self-monitoring conducting device that responds to strain and temperature changes occurring at the beginning of a normal zone which may or may not be a precursor to a quench condition. According to various embodiments of the present disclosure, optical fiber sensors can be integrated into superconducting cables to monitor local normal zones and any local thermal or mechanical perturbation within the cables. Due to the sensing capabilities introduced by the integrated optical fibers, early and precise detection of normal zones are possible as a function of location in the cable.

A self-monitoring conductor can have distinct advantages for quench detection and protection and can be used to identify any unexpected and/or expected mechanical strain and/or temperature change within the conductor during magnet manufacturing, cool-down, and operation. The self-monitoring conductor can provide a level of quench protection not available with existing systems and ensure the reliable operation of critical and costly magnet systems. The self-monitoring conductor technology can significantly increase the reliability of advanced magnet systems needed for nuclear fusion devices, MRI systems, motors and generators, and particle colliders and detectors for high energy physics (HEP) being planned for critical energy, defense, medical and other commercial applications. This increased reliability will enable the use of HTS architectures in these applications, protect the systems from failure, and extend the lifetime of the systems, ultimately leading to lower costs for both the advanced magnets and systems. In various embodiments, the optical fiber sensors may be integrated within superconducting cables that may be used in high-field magnetic applications having magnetic fields above about twenty (20) Tesla (T). For example, in some embodiments, the superconducting cables can comprise a conductor on round core (CORC®) cables, Roebel cables, and/or any other type of cable that can be used in high-field magnetic applications operating with magnetic fields above about 20 T.

HTS wires can be used in commercial and military applications, such as, for example, fault current limiters (FCLs) deployed in the electrical grid, superconducting magnetic energy storage (SMES) devices, power transmission lines, multiple cable projects around the world, defense applications, rotating machines, and high field magnet applications. As HTS wire is introduced into coils for such critical, expensive applications, it is extremely desirable to be able to continuously monitor the condition of the wire to ensure the coil and the entire system is not damaged due to an unprotected quench. A superconducting cable can comprise multiple HTS wires. However, due to the high current density and the stresses acting on each superconducting wire forming a cable in applications operating with magnetic fields above 20 T, if a transition to the normal state occurs locally in one of the wires it can transfer to the neighboring wires and invest the whole cable, drastically damaging the magnet.

A quench is an irreversible transition of a superconducting magnet to the normal state originating from a normal zone. A normal zone is a region of superconductor within a superconducting magnet carrying an electrical transport current greater than the local critical current and can be generated by adverse events like a failure of the cooling system, a crack in the impregnation or structural material, particle showers in accelerators, mechanical overloads, fatigue and/or any other event that introduces heat into the conductor. Thus, the self-monitoring capability of the present disclosure can be extremely valuable to and impactful for a wide range of energy, high energy physics, commercial, medical, and military application using superconducting cables.

To safely operate a large, high field superconducting magnet, regardless of conductor type, a thorough understanding of the quench behavior of the conductor and magnet is required. A quench is the irreversible transition of a superconducting device to the normal state and it is accompanied by a thermal runaway that can irreversibly damage both conductor and other systems. Any quench starts from a normal zone that grows with time and spreads throughout the system. Although the quench behavior of low temperature superconductor (LTS) magnets is well understood, HTS magnets show distinctly different quantitative behavior. For example, the minimum quench energy (MQE) in HTS magnets is quite high, but the corresponding normal zone propagation velocity (NZPV) is a few orders-of-magnitude slower than in LTS magnets. Thus, while the basic physics of quench behavior is unchanged, from a practical perspective the quantitative differences in behavior dominate. According to various embodiments of the present disclosure, normal zones can be detected and located sufficiently quickly so that a protection system can be activated to prevent irreversible damage.

The aim of any quench protection system is to prevent permanent conductor degradation in the event of a fault condition that induces a normal zone. Quench protection involves three key steps, all of which must be accomplished within a time-budget determined by the rate of growth of a disturbance and the resilience of the conductor: (1) detection of a disturbance or normal zone (also known as a hot-spot), which is historically accomplished via voltage measurements, (2) assessment of the disturbance to determine if it is going to induce a quench while preventing false-positives, and (3) protective action to prevent degradation if the magnet is quenching. For large magnets with a large stored energy, step (3) is typically accomplished through heaters embedded in the magnet and a dump circuit into which the stored energy is dissipated. The key to quench protection is preventing degradation by limiting localized temperature increase relative to the ability to detect and protect within the time available before degradation occurs. To determine the time budget, one must understand both the quench dynamics and the operational limits of the conductors; these two factors determine the time budget for protection. For LTS magnets, the safe operational limits are quantified in terms of a maximum hot-spot temperature, but due to the very slow NZPV in HTS magnets, a "minimum propagating zone" approach is likely to be more effective.

From the perspective of quench protection and the available time-budget, the challenge of slow NZPV is quench detection. Specifically, if the normal zone does not propagate quickly, then neither does the detectable voltage signal, which may result in degradation before a protection system can take action. Note that if voltage measurements are used for quench detection, then only the portion of the conductor with a local temperature greater than the current sharing temperature, $T_{cs}$, produces any signal. Thus, by definition, the larger the stability temperature margin, the longer the delay between the onset of a disturbance and a detectable voltage signal. In principle, slow NZPV can expand the time-budget, in which case, the delayed detection would not be problematic as the two effects could cancel (i.e., relative to LTS magnets, everything would be similar but in "slow motion"). This is not the case, however, because traditional quench detection is based upon voltage measurements. Voltage is simply the line integral of the electric field between the two voltage taps. The electric field profile is directly correlated with the temperature profile, so a normal zone with a short, highly peaked temperature profile produces the same voltage as a long normal zone with a relatively low peak temperature. The highly peaked temperature profile, which is the result of a slow NZPV, is more likely to cause degradation. Thus, either significantly enhanced quench propagation is needed, or quench detection needs significantly higher spatial resolution.

Optical fiber sensors have evolved to meet a number of sensing needs in many science and engineering fields and using a variety of interrogation techniques. In general, all of the interrogation techniques are based upon either the transmission or reflection of light propagating in the fiber. One interrogation technique uses fiber Bragg gratings, for which a small Bragg grating is inscribed at one or more locations along the length of a fiber. The spacing of the grating has a characteristic reflection, so changes in the Bragg reflection indicate changes in the spacing between the lines of the grating. As the line spacing changes with either strain or temperature, a simple, fast point-sensor results. For superconducting magnets, however, the Bragg grating approach suffers from being a point-sensor, and thus does not offer improvement in spatial resolution over conventional voltage taps. While one can inscribe multiple gratings on a single fiber, the approach remains intrinsically limited to measurements at pre-determined locations.

Another optical interrogation technique relates to deriving the signal using Rayleigh backscattering. The fundamental principle of Rayleigh backscattering is similar to that of Bragg gratings except that rather than inscribing gratings at predetermined locations on the optical fiber, the light scattered from the naturally occurring defects within the fiber is interpreted through a "Rayleigh interrogator." When the fiber length is changed via a change in strain or temperature, these defects are altered, thus altering the reflected signal. A Rayleigh backscattering interrogator thus compares a reference backscattered spectrum to each subsequent spectra, and the resulting "spectral shifts," which are a function of location and time, translate into the time-varying strain or temperature distributions. Since the spatial resolution is only limited by the wavelength of the interrogating light and by limitations associated with data acquisition and processing speed, the Rayleigh scattering interrogated optical fiber is a true distributed sensor. While other types of interrogating techniques can be used with optical fiber sensing, Rayleigh scattering is a preferred embodiment in the present disclosure.

Figure 1A:
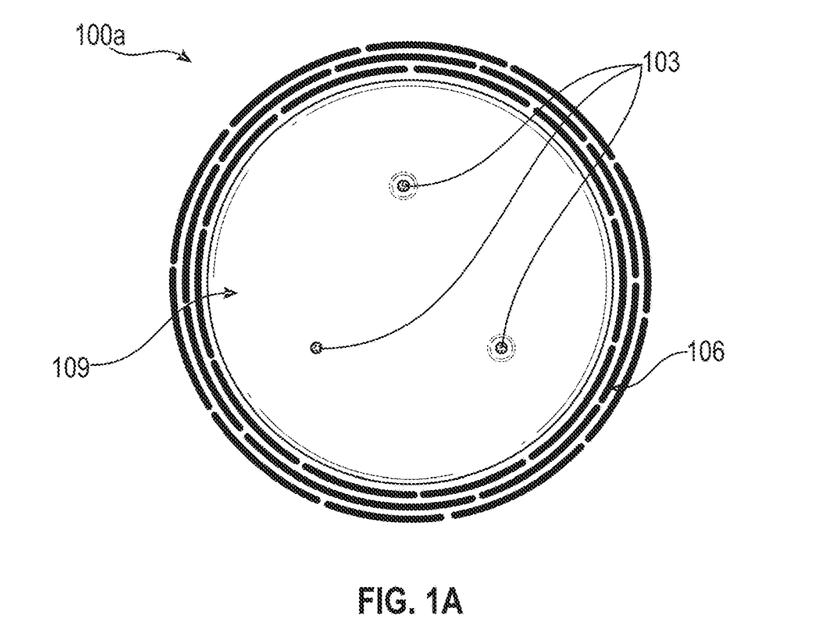
FIGS. 1A and 1B illustrate examples of a self-monitoring conducting device according to various embodiments of the present disclosure.

Turning now to FIG. 1A, shown is an example of a cross-section of a self-monitoring conducting device 100a according to various embodiments of the present disclosure. Specifically, FIG. 1A illustrates a cross-section of optical fiber sensors 103 integrated into a superconducting cable. FIG. 1A illustrates layers of HTS tape architecture 106 wound on a round core 109. The HTS tape architecture 106 can comprise rare earth barium-copper oxide (REBCO) tape, REBCO/YBCO coil, bismuth-strontium-calcium-copper oxide (BSCCO) wires and/or tapes, and/or other types of conducting materials that comprise laminate structures. According to various embodiments, the HTS tape architecture 106 can vary in width and/or thickness. The HTS tape architecture 106 can be wound on the round core 109 with a different or a same winding pitch. In some embodiments, multiple layers of the HTS tape architecture 106 can be wound to form a stack, with the same or different winding path. The core 109 can comprise copper, stainless steel, aluminum, and/or any type of resistive solid material that is strong and ductile.

Figure 5A:
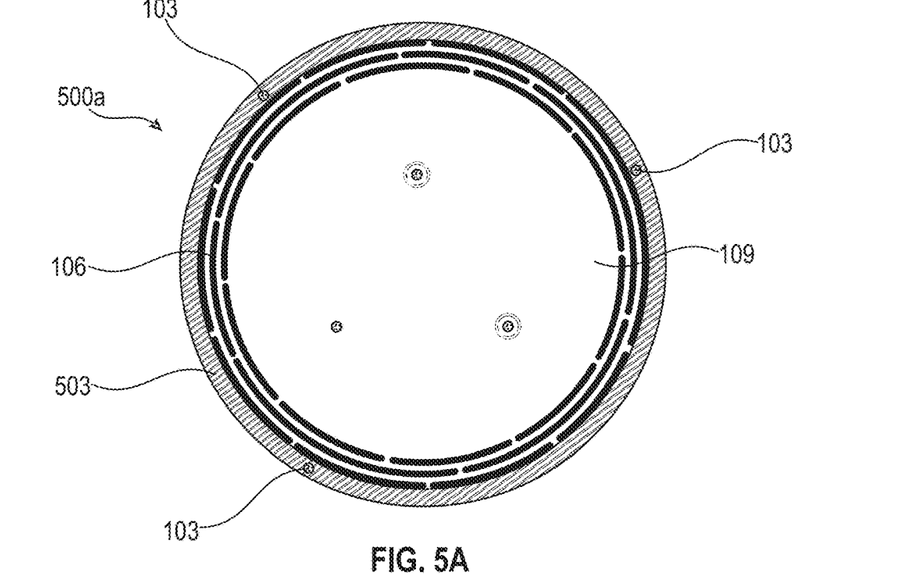
FIGS. 5A and 5B illustrate other examples of a cross-section of a self-monitoring conducting device having an outer insulating material according to various embodiments of the present disclosure.
Figure 5B:
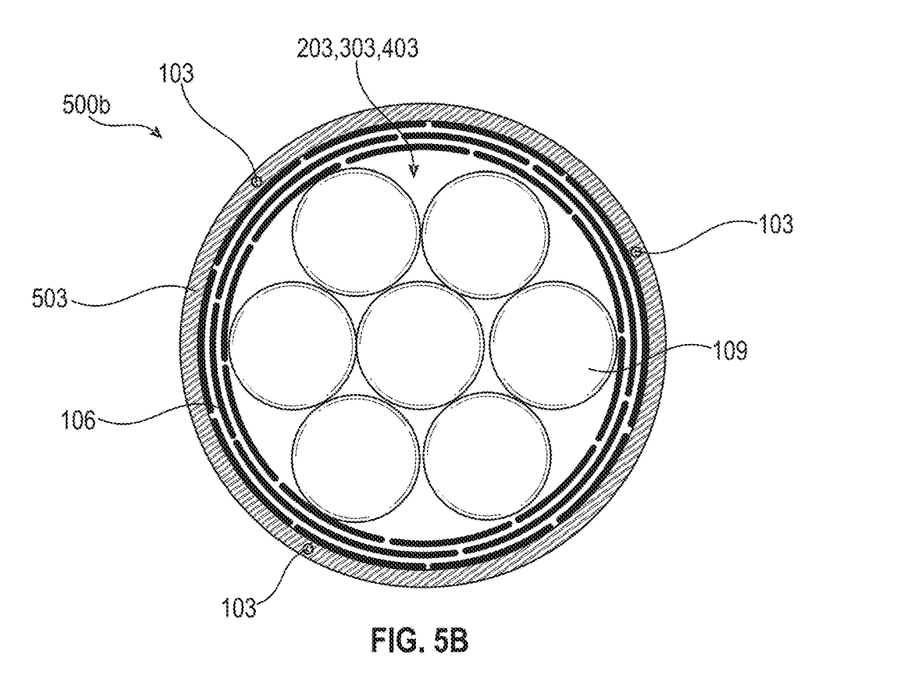

In some embodiments, an insulating material 503 (FIG. 5) may be positioned between the core 109 and the HTS tape architecture 106. The insulating material may comprise kapton, polyimide, titania, and/or other polymeric or ceramic electrically insulating materials. In other embodiments, there is no insulation between the core and the HTS tape architecture 106. With no insulation between the core and the HTS tape architecture 106, the core 109 can serve as an electrical stabilizer instead of being only a structural support. In this configuration, during a transition to the normal state of the one or more HTS tape architectures 106, the current flows into the core 109 because it is the parallel circuit with lowest resistance. Therefore, the heating occurs where the fibers 103 are located.

While FIG. 1A illustrates optical fibers 103 embedded within the core 109 of the superconducting cable, the optical fibers 103 can be integrated into the core 109, the HTS tape architecture 106, and/or an insulating material according to various embodiments of the present disclosure.

Figure 1B:
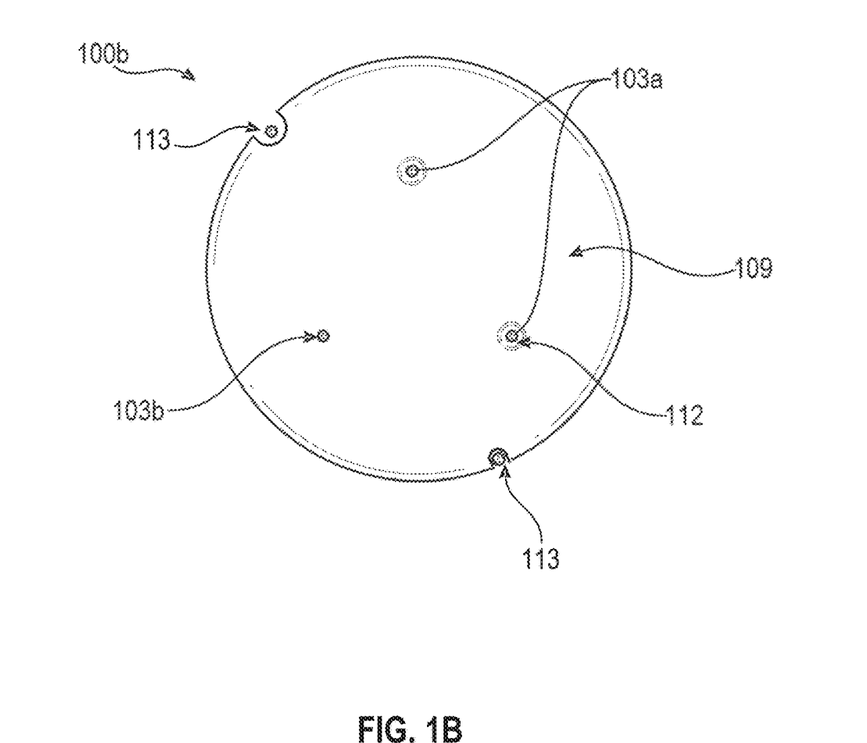

Turning now to FIG. 1B, shown is an example of a cross-section of a self-monitoring conducting device 100b according to various embodiments of the present disclosure. FIG. 1A differs from FIG. 1B in that FIG. 1B does not show the layers of HTS tape architecture 106 wound about the core 109. Although not shown in FIG. 1B, one or more layers of HTS tape architectures 106 can be wound about the core 109. The number and/or width of HTS tape architectures 106 wound about the core may vary according to various embodiments of the present disclosure.

In FIG. 1B, optical fibers 103 (e.g., 103a, 103b) are embedded within the core 109. In some embodiments, the core 109 can comprise holes that are sized greater than the diameter of the optical fibers 103 such that there is a gap 112 between the optical fibers 103 and the core material 109. The size of the gap 112 may vary according to various embodiments. In some embodiments, the gap 112 may be filled with a thermally conducting material, such as, for example, solder, low melting temperature metals such as bismuth, indium, tin, lead, aluminum and their alloys, epoxy resins, thermally conductive polymers (such as polymers filled with boron nitride).

In some embodiments, the core 109 may comprise holes that are sized such that the optical fibers 103 are in contact with the core 109. In some embodiments, the optical fibers 103 may be embedded within the core 109 such that some of the optical fibers 103a are surrounded by a gap 112 within the core 109 and some of the optical fibers 103b are in contact with the core 109. By having the optical fibers 103 loose in the holes or in contact with the core 109, the strain and temperature can be measured separately. The optical fiber 103 that does not have, or has a minimal mechanical coupling with the core 109 will measure temperature changes only, whereas the optical fiber 103 that is in good mechanical coupling with the core 109 will measure a signal that includes both temperature and strain changes. A subtraction of the two signals isolates the strain changes, thus allowing for a separate monitoring of both strain and temperature changes.

In some embodiments, the self-monitoring conducting device 100b can comprise one or more grooves 113 at the surface of the core and an optical fiber 103 can be positioned within a groove 113. In some embodiments, one or more grooves 113 can be twisted along the cable length. In other embodiments, one or more grooves 113 can be straight. According to various embodiments, the shape and size of the grooves 113 and holes in the core 109 can vary.

It should be noted that while the self-monitoring conducting device 100b of FIG. 1B illustrates the holes and grooves 113 in a particular configuration, the position of the hole and grooves 113 can vary within the core. In addition, the shape and/or size of the grooves 113 and/or holes in the core 109 can vary. It should be further noted that while the self-monitoring conducting devices 100 of FIGS. 1A and 1B shows three different optical fibers 103, the number of optical fibers (and holes within the core) may vary.

Figure 2:
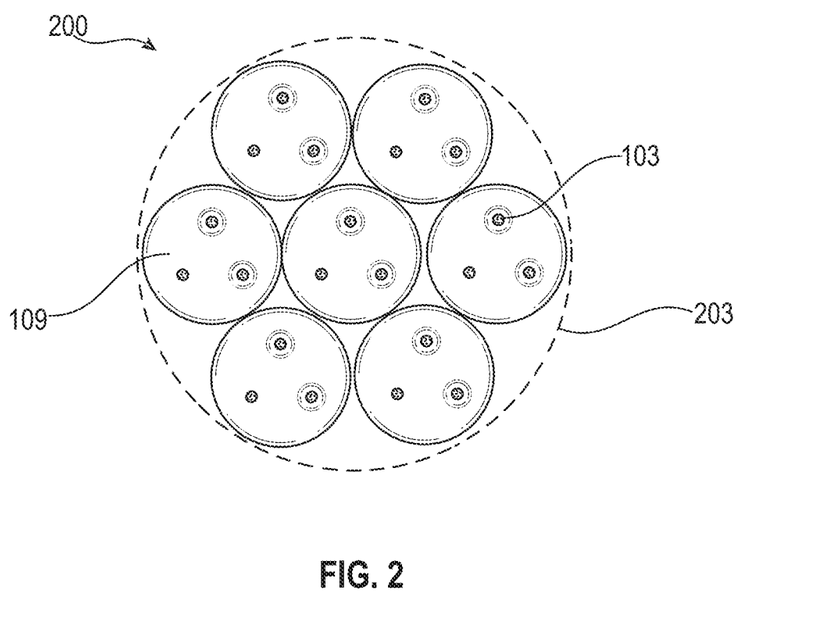
FIG. 2 illustrates an example of a cross section of a self-monitoring conducting device according to various embodiments of the present disclosure.

Moving on to FIG. 2, shown is an example of a cross section of a self-monitoring conducting device 200 according to various embodiments of the present disclosure. The self-monitoring conducting device of FIG. 2 illustrates a superconducting cable comprising a CORC-like cable having a central core 203 containing multiple cores 109. Although not shown in FIG. 2, the central core 203 can be surrounded by one or more HTS tape architectures 106. According to various embodiments, the number and/or width of HTS tape architectures 106 can vary. Although each core 109 of the superconducting cable comprises three different optical fibers 103 in FIG. 2, the number of optical fibers 103 in each core 109 can vary. For example, one core 109 may comprise zero optical fibers 103 while another core 109 may comprise five optical fibers 103.

Figure 3A:
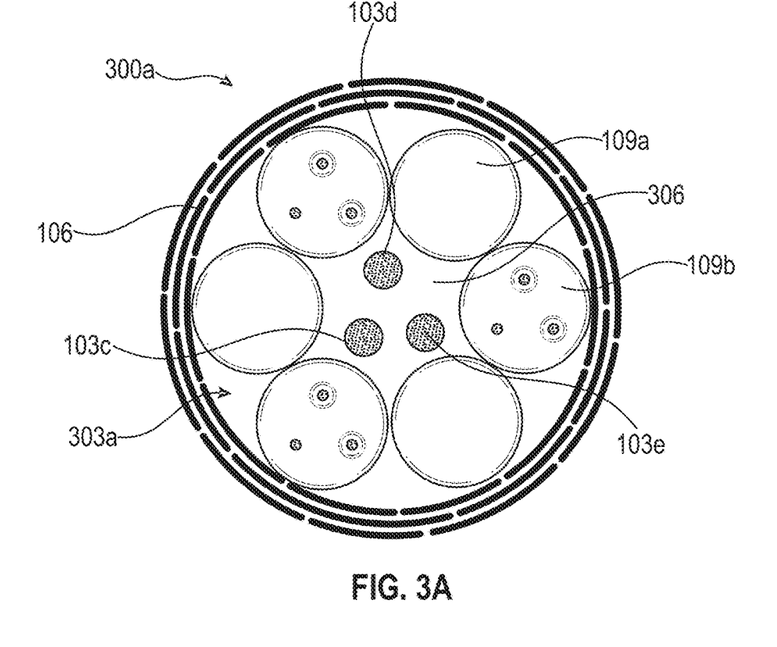
FIGS. 3A-3B illustrate other examples of cross sections of a self-monitoring conducting device according to various embodiments of the present disclosure.
Figure 3B:
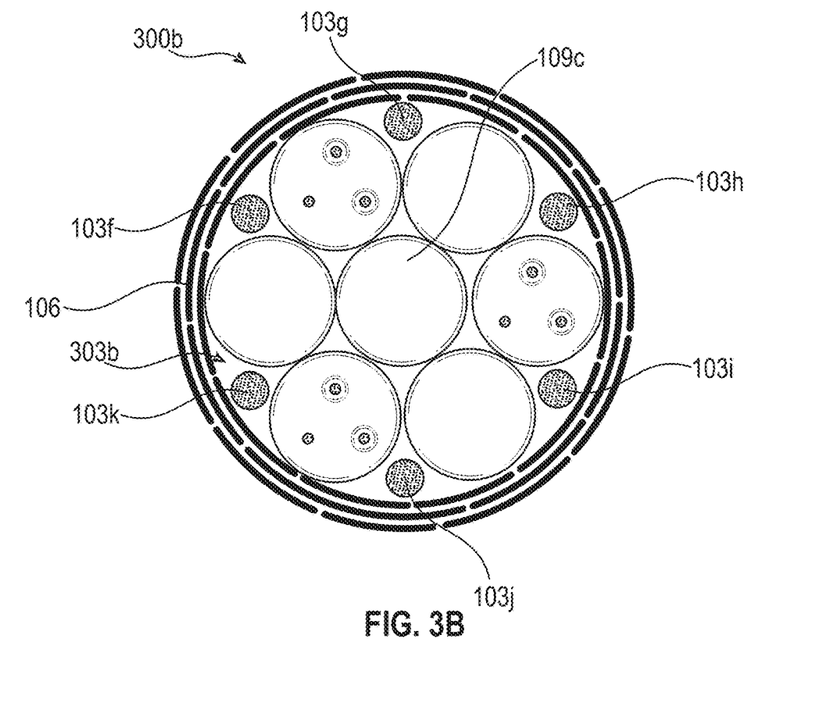

Moving on to FIGS. 3A and 3B, shown are examples of a cross section of a self-monitoring conducting device 300 (e.g., 300a, 300b) according to various embodiments of the present disclosure. The self-monitoring conducting device 300 of FIGS. 3A-3B illustrates a superconducting cable comprising a CORC-like cable having central core 303 (e.g., 303a, 303b) comprising multiple cores 109 (e.g., 109a, 109b). As shown in FIGS. 3A and 3B, the central core 303 is surrounded by one or more HTS tape architectures 106 wound about the central core 303. According to various embodiments, the number and/or width of HTS tape architectures 106 surrounding the central core 303 can vary. Although FIGS. 3A and 3B illustrate some cores 109a without any optical fibers 103, and some cores 109b with three optical fibers, the number of optical fibers 103 in each core 109 can vary. For example, one core 109 may comprise zero optical fibers 103, while another core 109 may comprise five optical fibers 103. In another non-limiting example, all cores 109 may comprise one or more optical fibers 103.

The self-monitoring conducting device 300 of FIG. 3A and FIG. 3B differs from the self-monitoring conducting device 200 of FIG. 2 in that the self-monitoring conducting device of FIGS. 3A and 3B contains optical fibers 103 embedded between the cores 109 that make up the central core 303. For example, in FIG. 3A, optical fibers 103 (e.g. 103c-103e) are embedded within three of the smaller cores 109 and are embedded within the center 306 of the central core 303a that is surrounded by the smaller cores 109. In FIG. 3B, the central core 303b comprises a smaller core 109c that is surrounded by other smaller cores 109, and further contains optical fibers 103 (e.g., 103f-104k) embedded between the outer portion of the outer smaller cores 109 and the HTS tape architectures 106. According to various embodiments, the number of optical fibers 103 in each smaller core 109 can vary from zero to five. In other embodiments, the number of optical fibers 103 situated between the smaller cores 109 may vary.

Turning now to FIGS. 4A-4D, shown are examples of various embodiments of cross-sections of self-monitoring conducting devices 400 (e.g., 400a, 400b, 400c, 400d) according to various embodiments of the present disclosure. Specifically, FIGS. 4A-4D illustrate examples of optical fiber sensors 103 integrated between HTS tape architectures 106 surrounding the core 109 of the superconducting cable.

Figure 4A:
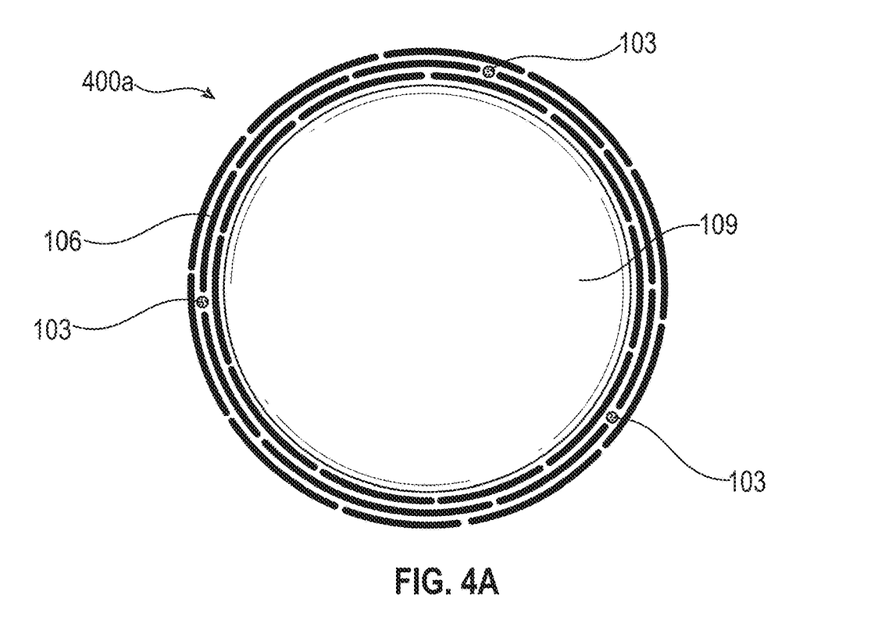
FIGS. 4A-4D illustrate examples of cross-sections of self-monitoring conducting devices according to various embodiments of the present disclosure.

FIG. 4A illustrates a self-monitoring conducting device 400a comprising a solid core 109 surrounded by multiple layers of HTS tape architectures 106 wound about the solid core 109 according to various embodiments of the present disclosure. As shown in FIG. 4A, optical fibers 103 are embedded between HTS tape architectures 106. According to various embodiments, the number and/or position of the optical fibers 103 present in between the HTS tape architectures 106 can vary.

Figure 4B:
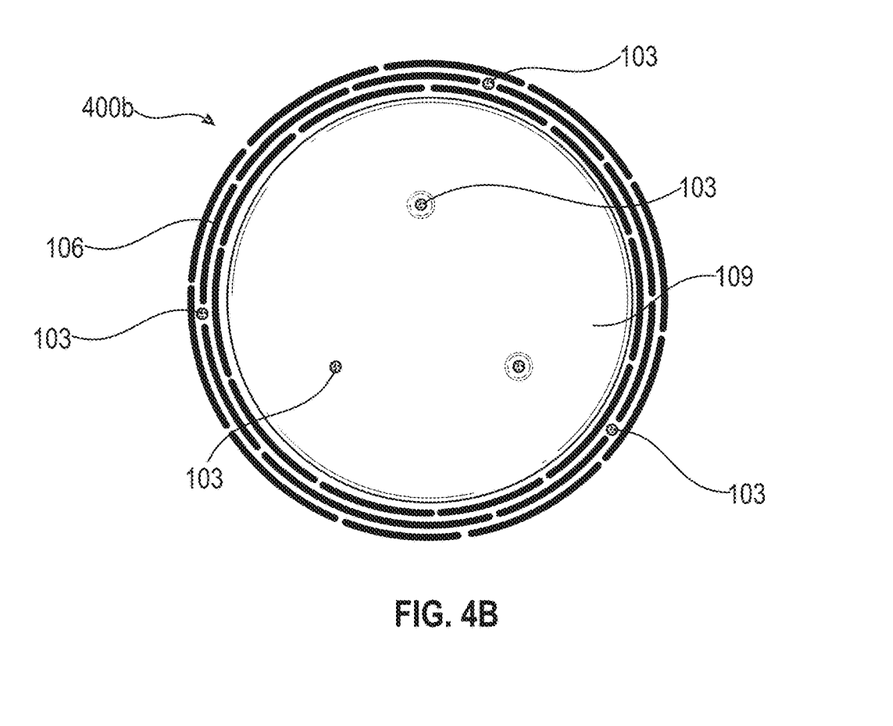

FIG. 4B illustrates a self-monitoring conducting device 400b comprising a core 109 surrounded by multiple layers of HTS tape architectures 106 according to various embodiments of the present disclosure. In FIG. 4B, optical fibers 103 are embedded within the core 109 and in between HTS tape architectures 106 according to various embodiments.

Figure 4C:
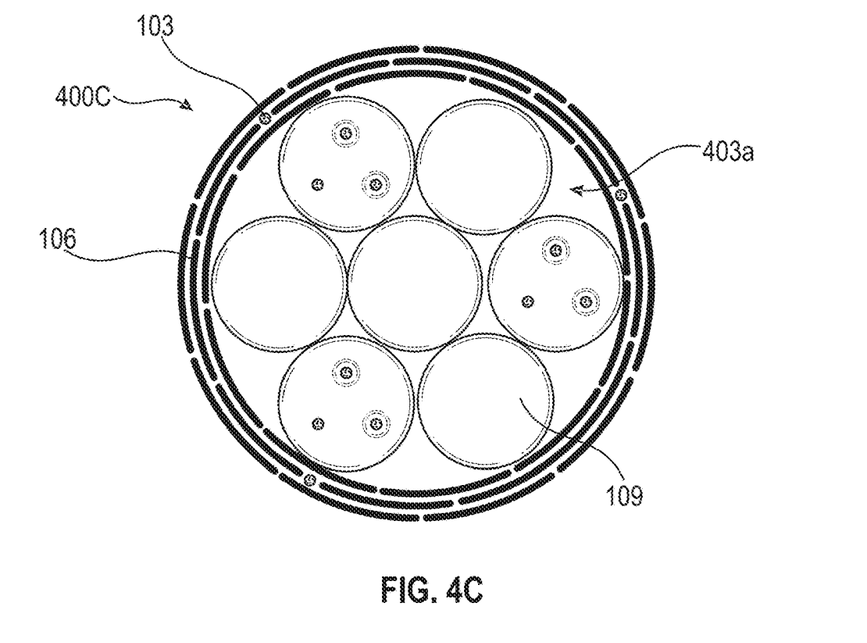

FIG. 4C illustrates a self-monitoring conducting device 400c comprising a central core 403a surrounded by multiple layers of HTS tape architectures 106 according to various embodiments of the present disclosure. The central core 403a comprises multiple smaller cores 109 and the optical fibers 103 are embedded within some of the smaller cores 109 and in between HTS tape architectures 106 according to various embodiments.

Figure 4D:
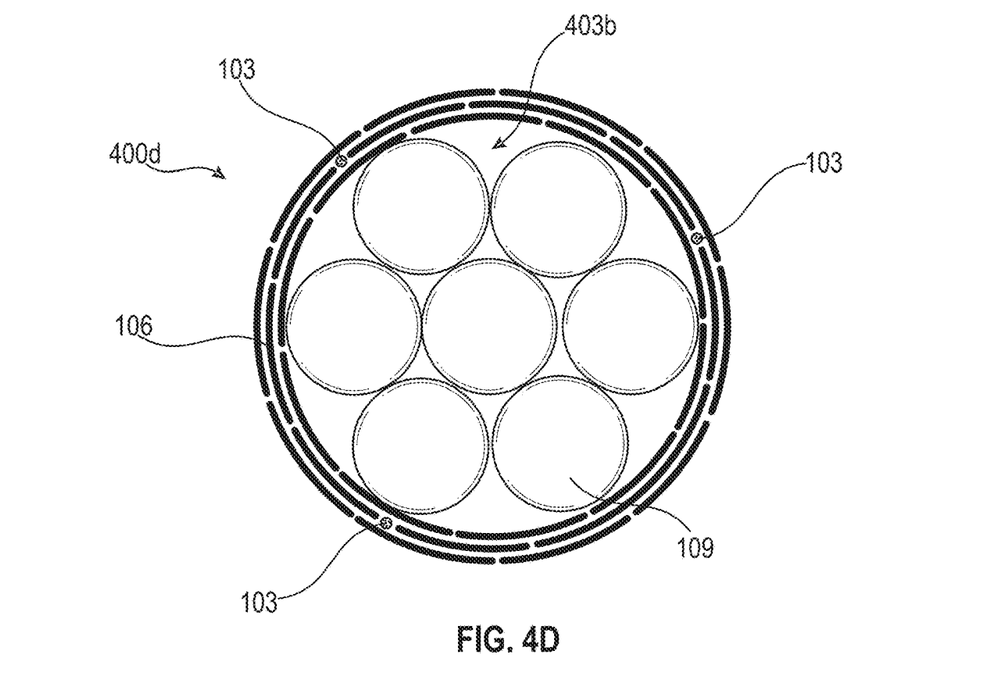

FIG. 4D illustrates a self-monitoring conducting device 400d comprising a central core 403b surrounded by multiple layers of HTS tape architectures 106. The central core 403b comprises multiple smaller cores 109 and the optical fibers 103 are embedded in between HTS tape architectures 106 according to various embodiments. FIG. 4D differs from 4C in that the central core 403b of FIG. 4D does not contain any optical fibers 103.

Moving on to FIGS. 5A and 5B, shown are example cross-sections of self-monitoring conducting devices 500 (e.g., 500a, 500b) according to various embodiments of the present disclosure. The self-monitoring conducting devices of FIGS. 5A and 5B comprise a superconducting cable having a core 109 that is surrounded by one or more layers of HTS tape architectures 106.

In FIGS. 5A and 5B, the HTS tape architectures 106 are surrounded by an insulating material 503 or protective outer sheath. The optical fibers 103 are embedded within the insulating material 503 or protective outer sheath. According to various embodiments, the number of optical fibers 103 embedded within the insulating material 503 or protective outer sheath can vary. FIG. 5B differs from FIG. 5A in that the core 109 of FIG. 5B comprises a central core 203, 303, 403 having multiple smaller cores 109 while the core 109 of FIG. 5A is a solid core 109. It should be noted that according to various embodiments, the self-monitoring conducting devices 100, 200, 300, 400 of FIGS. 1A, 1B, 2, 3, and 4A-4D can also comprise an electrical insulation 503 or protective outer sheath surrounding the HTS tape architectures 106 and that optical fibers 103 may also be embedded within the electrical insulation 503 or protective outer sheath.

Figure 6:
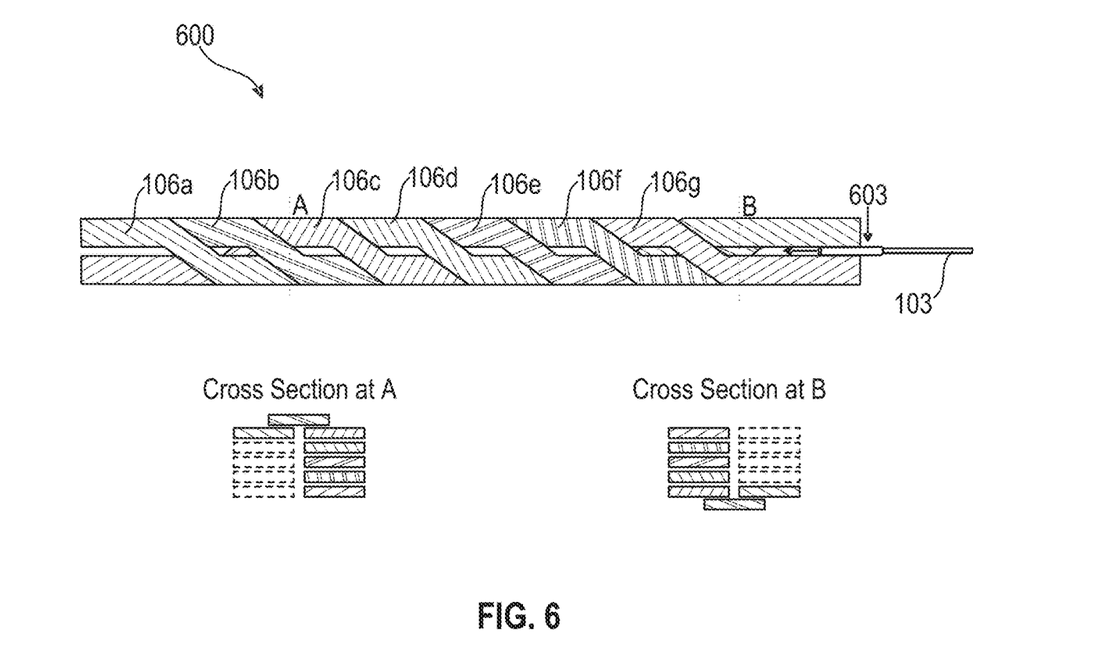
FIG. 6 illustrates another example of a self-monitoring conducting device according to various embodiments of the present disclosure.

Turning now to FIG. 6, shown is another example of a self-monitoring conducting device 600 according to various embodiments of the present disclosure. The self-monitoring conducting device 600 of FIG. 6 comprises a Roebel-type superconducting cable comprising a plurality of intertwined HTS tape architectures 106 (e.g., 106a-106g). The self-monitoring conducting device comprises one or more optical fibers 103 integrated within the superconducting cable. In some embodiments, the one or more optical fibers 103 can be surrounded by a housing 603 (e.g., a capillary tube) and/or be coated with a suitable coating such as, for example, polyimide, acrylate, tin, aluminum, zinc, indium-bismuth alloys, carbon, and/or a combination of those coatings in a multi-layer coating architecture. FIG. 6 illustrates a cross-section at position A and a cross section at position B according to various embodiments of the present disclosure.

Figure 7:
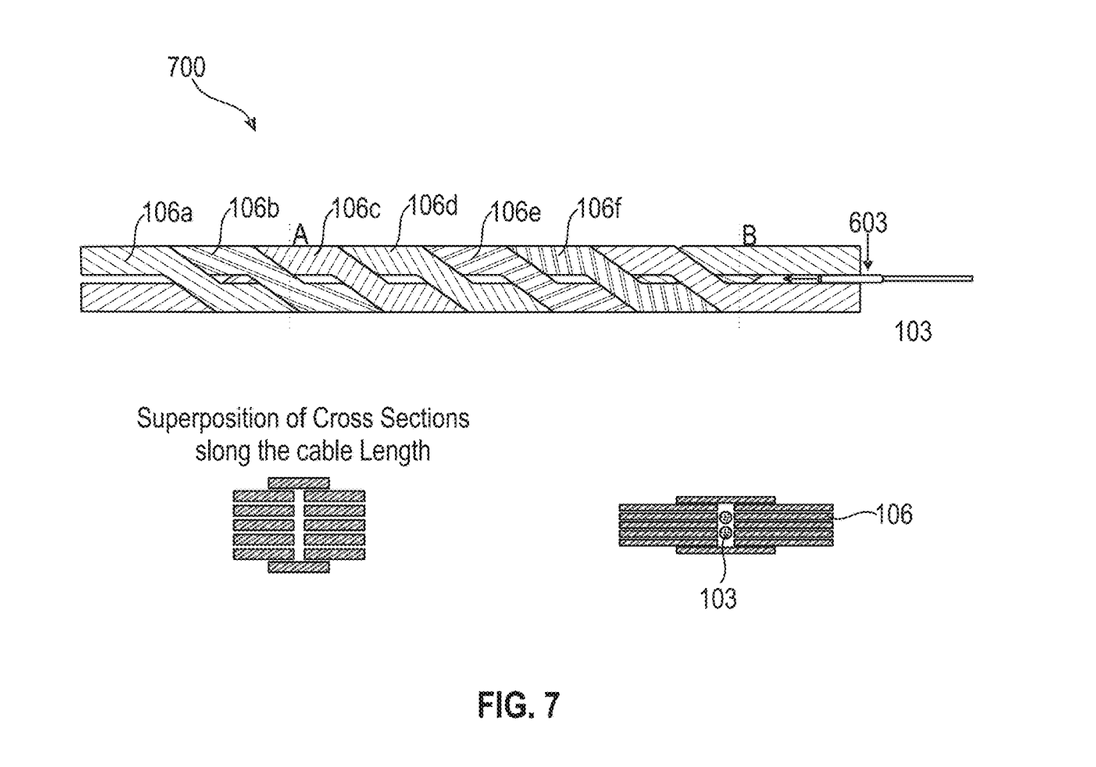
FIG. 7 illustrates another example of a self-monitoring conducting device according to various embodiments of the present disclosure.

Moving on to FIG. 7, shown is another example of a self-monitoring conducting device 700 according to various embodiments of the present disclosure. Similar to the self-monitoring conducting device of FIG. 6, the self-monitoring conducting device 700 comprises a Roebel-type cable comprising a superconducting cable of multiple intertwined HTS tape architectures 106. One or more optical fibers 103 are embedded within the superconducting cable. FIG. 7 further illustrates cross-sections of the cable along section A and section B according to various embodiments of the present disclosure.

Figure 8A:
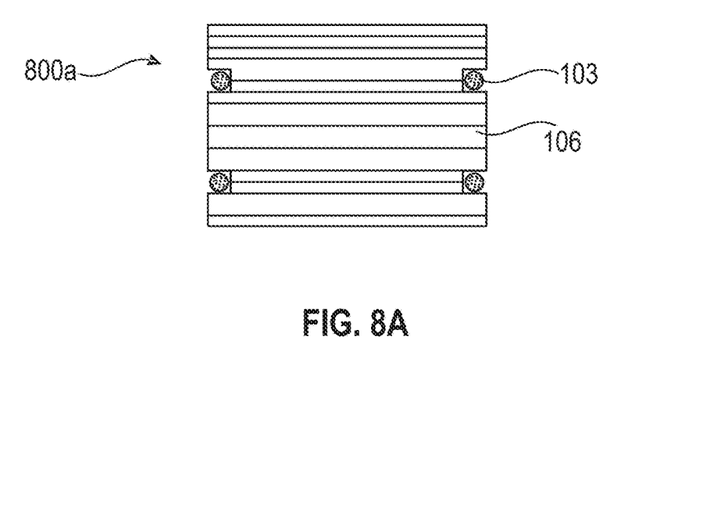
FIGS. 8A, 8B, and 8C illustrate examples of cross-sections of self-monitoring conducting devices showing different placements of the optical fibers according to various embodiments of the present disclosure.
Figure 8B:
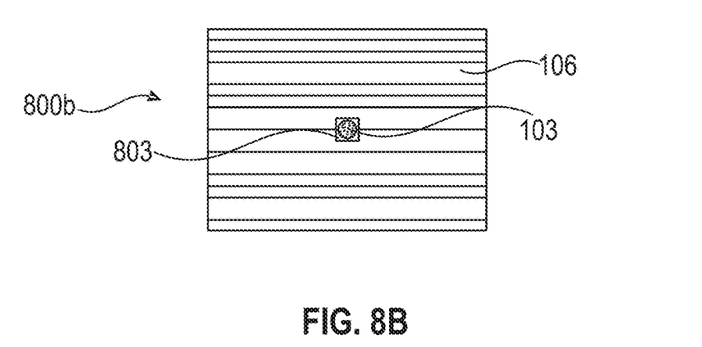
Figure 8C:
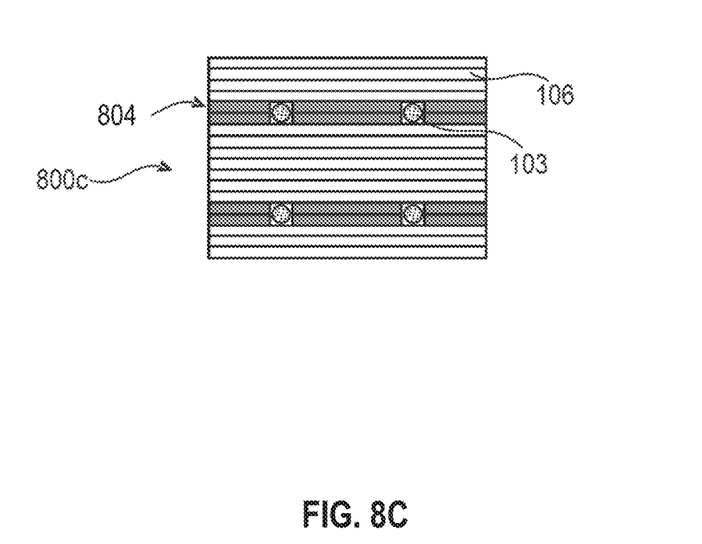

Turning now to FIGS. 8A-8C, shown are examples of cross-sections of a self-monitoring conducting device 800 (e.g., 800a-800c) according to various embodiments of the present disclosure. Specifically, FIGS. 8A-8C illustrate examples of optical fiber sensors 103 integrated between stacked HTS tape architectures 106. According to various embodiments, a number of HTS tape architectures 106 are stacked on top of one another. In other embodiments, the stack comprises HTS tape architectures as well as normal conducting tape architectures 804 (see FIG. 8C), wherein the number, thickness and width of normal conducting architectures may vary according to various embodiments. Normal conducting tape architectures 804 may comprise copper, aluminum or other electrically conducting materials. In various embodiments, the longitudinal stack may be twisted with a particular twist pitch. In other embodiments, the longitudinal stack is not twisted.

FIG. 8A illustrates a self-monitoring conducting device 800a comprising optical fibers 103 integrated along the sides of stacked HTS tape architectures 106 according to various embodiments of the present disclosure.

FIG. 8B illustrates a self-monitoring conducting device 800b comprising an optical fiber 103 being embedded near the center 803 of the superconducting cable comprising stacked HTS tape architectures 106 according to various embodiments of the present disclosure. FIG. 8C illustrates a self-monitoring conducting device 800c comprising optical fibers 103 being embedded in various areas within the superconducting cable comprising stacked HTS tape architectures 106 and the normal conducting tape architectures 804 according to various embodiments of the present disclosure.

Figure 9A:
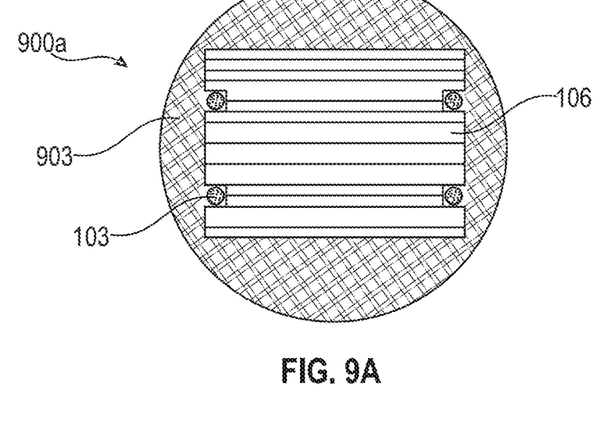
FIGS. 9A, 9B, and 9C illustrate examples of cross-sections of self-monitoring conducting devices showing different placements of the optical fibers and being encapsulated by an external circular structure according to various embodiments of the present disclosure.
Figure 9B:
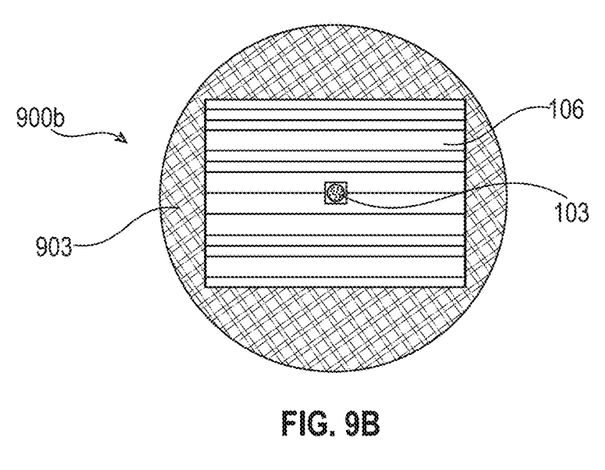
Figure 9C:
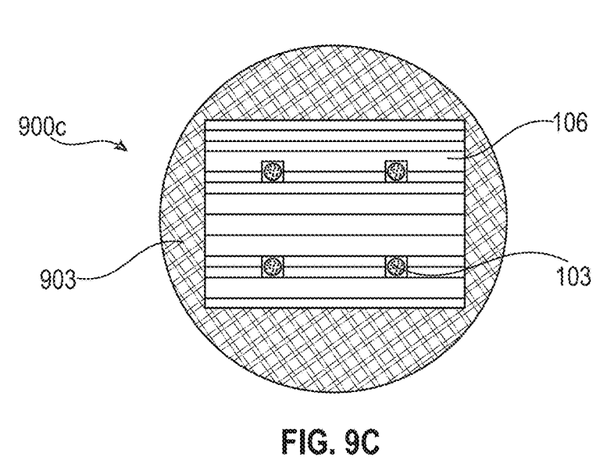

Turning now to FIGS. 9A-9C, shown are examples of cross-sections of self-monitoring conducting devices 900 (e.g., 900a, 900b, 900c) according to various embodiments of the present disclosure. Specifically, FIGS. 9A-9C illustrate examples of optical fiber sensors 103 integrated between stacked HTS tape architectures 109. According to various embodiments, a number of HTS tape architectures 106 are stacked on top of one another. In various embodiments, the longitudinal stack may be twisted with a particular twist pitch. In other embodiments, the longitudinal stack is not twisted. FIGS. 9A-9C differ from FIGS. 8A-8C in that the self-monitoring conducting devices 900 of 9A-9C further comprise an external circular structure 903 encapsulating the stack of HTS tape architectures 106. The external circular structure 903 can comprise aluminum, copper, or any other suitable structural material. In other embodiments, the stack of HTS tape architectures is surrounded by an electrically insulating wrap, instead of an external structure. The insulating wrap may comprise polyimide, fiberglass or other electrically insulating material.

FIG. 9A illustrates a self-monitoring conducting device 900a comprising optical fibers 103 integrated along the sides of stacked HTS tape architectures 106 according to various embodiments of the present disclosure. FIG. 9B illustrates a self-monitoring conducting device 900b comprising an optical fiber 103 being embedded near the center of the superconducting cable comprising stacked HTS tape architectures 106 according to various embodiments of the present disclosure. FIG. 9C illustrates a self-monitoring conducting device 900c comprising optical fibers 103 being embedded in various areas within the superconducting cable comprising stacked HTS tape architectures 106 according to various embodiments of the present disclosure.

Figure 10A:
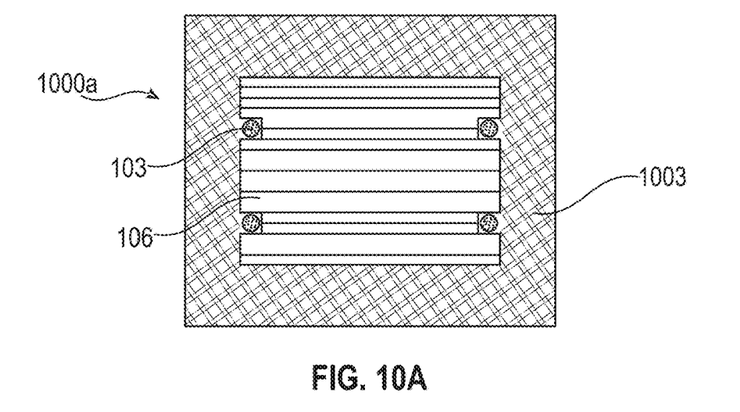
FIGS. 10A, 10B, and 10C illustrate examples of cross-sections of self-monitoring conducting devices showing different placements of the optical fibers and being encapsulated by an external four-sided structure according to various embodiments of the present disclosure.
Figure 10B:
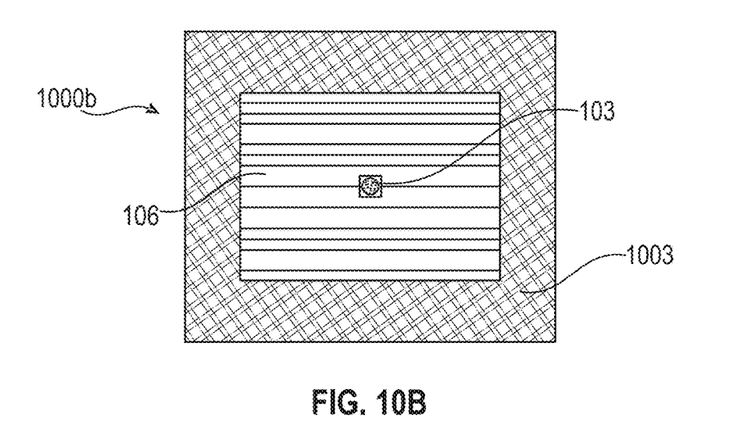
Figure 10C:
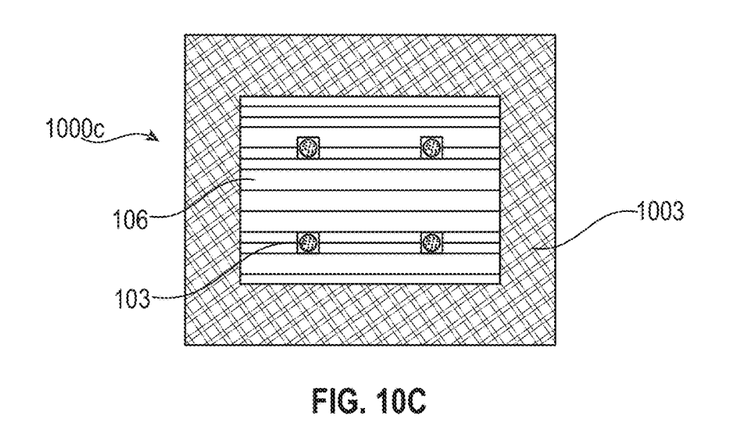

Turning now to FIGS. 10A-10C, shown are examples of cross-sections of a self-monitoring conducting device 1000 (e.g., 1000a, 1000b, 1000c) according to various embodiments of the present disclosure. Specifically, FIGS. 10A-10C illustrate examples of optical fiber sensors integrated between stacked HTS tape architectures 106. According to various embodiments, a number of HTS tape architectures 106 are stacked on top of one another. In various embodiments, the longitudinal stack may be twisted with a particular twist pitch. In other embodiments, the longitudinal stack is not twisted. FIGS. 10A-10C differ from FIGS. 9A-9C in that the self-monitoring conducting devices 1000 of 10A-10C further comprise an external structure having a four-sided (e.g. squared) cross-section 1003 encapsulating the stack of HTS tape architectures. The external four-sided structure 1003 can comprise aluminum, copper, stainless steel, and/oror any other suitable structural material.

FIG. 10A illustrates a self-monitoring conducting device 1000a comprising optical fibers 103 integrated along the sides of stacked HTS tape architectures 106 according to various embodiments of the present disclosure.

FIG. 10B illustrates a self-monitoring conducting device 1000b comprising an optical fiber 103 being embedded near the center of the superconducting cable comprising stacked HTS tape architectures 106 according to various embodiments of the present disclosure. FIG. 10C illustrates a self-monitoring conducting device 1000c comprising optical fibers being embedded in various areas within the superconducting cable comprising stacked HTS tape architectures 106 according to various embodiments of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A self-monitoring conducting device, comprising:
a superconducting cable having a core and one or more layers of high-temperature superconductor (HTS) tape architecture surrounding the core; and
a plurality of optical fibers embedded within the core of the superconducting cable, a first optical fiber of the plurality of optical fibers being embedded at a first position within the core to measure a first state of the superconducting cable along a length of the superconducting cable, and a second optical fiber of the plurality of optical fibers being embedded at a second position within the core to measure a second state of the superconducting cable along the length of the superconducting cable.

2. The self-monitoring conducting device of claim 1, wherein the core comprises a plurality of holes, and the first optical fiber is embedded within a first hole of the plurality of holes and the second optical fiber is embedded within a second hole of the plurality of holes.

3. The self-monitoring conducting device of claim 2, wherein the first hole is sized such that the first optical fiber is in contact with the core.

4. The self-monitoring conducting device of claim 2, wherein the second hole is sized such that there is a gap between the core and the second optical fiber.

5. The self-monitoring conducting device of claim 4, further comprising a thermally conductive material, the thermally conductive material being disposed within the gap between the second optical fiber and the core.

6. The self-monitoring conducting device of claim 4, wherein the second state comprises a strain.

7. The self-monitoring conducting device of claim 3, wherein the first state comprises a temperature.

8. The self-monitoring conducting device of claim 1, further comprising a structure surrounding the superconducting cable.

9. The self-monitoring conducting device of claim 8, wherein one or more of the plurality of optical fibers are integrated within the structure surrounding the superconducting cable.

10. The self-monitoring conducting device of claim 8, wherein the structure comprises a normal conducting material including at least one of copper, stainless steel, or aluminum.

11. The self-monitoring conducting device of claim 8, wherein the structure comprises an insulating material.

12. The self-monitoring conducting device of claim 1, further comprising at least one groove disposed along a length of an outer surface of the core, at least one of the plurality of optical fibers being positioned within the at least one groove.

13. The self-monitoring conducting device of claim 1, wherein the superconducting cable is configured to operate with magnetic fields above about twenty (20) Tesla.

14. The self-monitoring conducting device of claim 1, wherein the core comprises a plurality of smaller cores.

15. The self-monitoring conducting device of claim 1, wherein one or more of the plurality of optical fibers are embedded between the core and one or more layers of HTS tape architecture.

16. A self-monitoring conducting device, comprising:
a superconducting cable configured to be operable at about twenty (20) Tesla and above; and
a plurality of optical fibers embedded within a core of the superconducting cable, the plurality of optical fibers being configured to monitor a state of the superconducting cable along a length of the superconducting cable.

17. The self-monitoring conducting device of claim 16, further comprising a plurality of grooves disposed along an exterior surface of the core, at least one of the one or more optical fibers being embedded within one of the plurality of grooves.

18. The self-monitoring conducting device of claim 17, wherein the plurality of grooves are disposed along the exterior surface of the core in a twisted configuration.

19. The self-monitoring conducting device of claim 16, wherein the superconducting cable comprises a Roebel-type cable or a CORC-type cable.

20. The self-monitoring conducting device of claim 16, wherein a first optical fiber of the plurality of optical fibers is embedded at a first position within the core to measure a first state of the superconducting cable along a length of the superconducting cable, and a second optical fiber of the plurality of optical fibers being embedded at a second position within the core to measure a second state of the superconducting cable along the length of the superconducting cable.

* * * * *